W. H. TEUER.
PIPE COUPLING.
APPLICATION FILED OCT. 12, 1909.
951,889.
Patented Mar. 15, 1910.
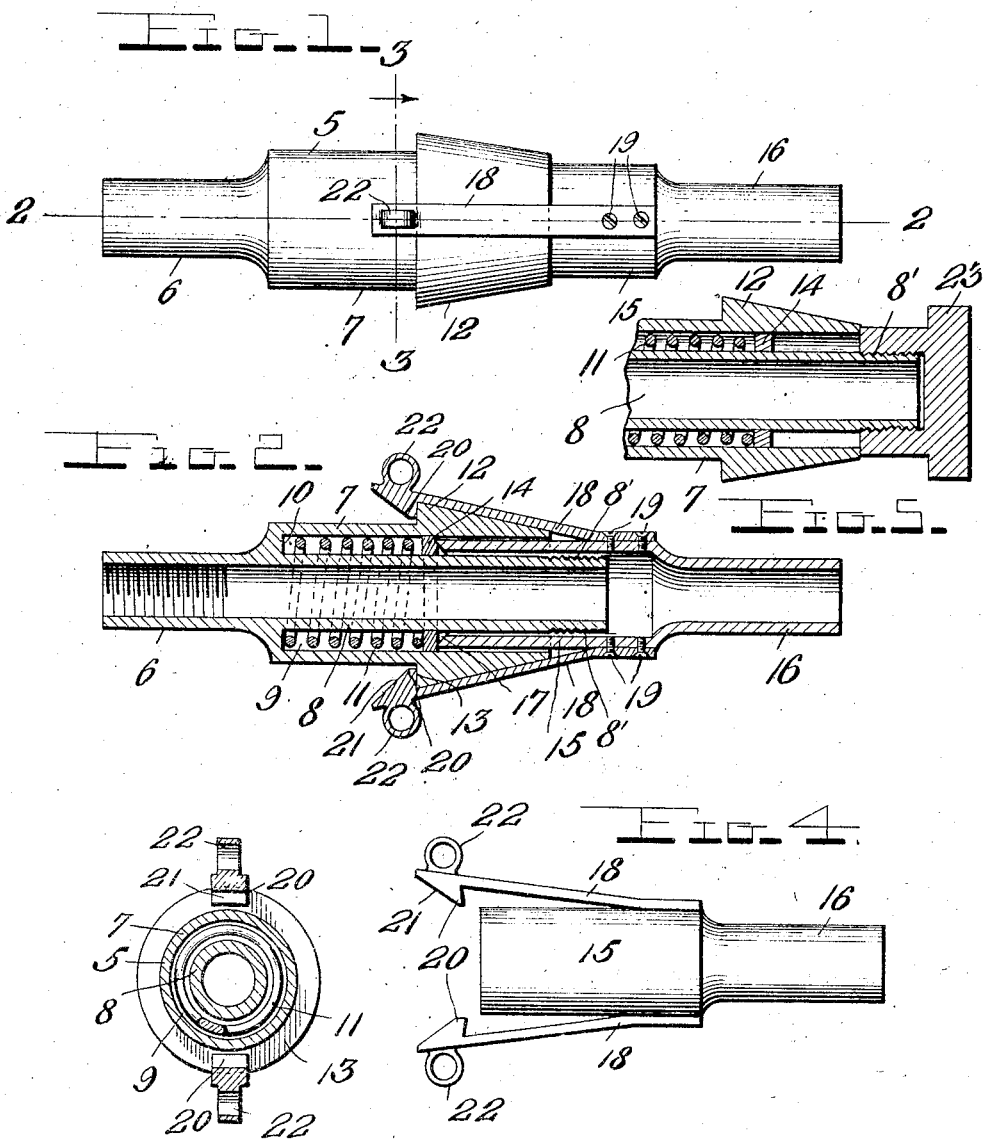

UNITED STATES PATENT OFFICE.

WILLIAM H. TEUER, OF CARTERVILLE, MISSOURI.

PIPE-COUPLING.

951,889.   Specification of Letters Patent.   Patented Mar. 15, 1910.

Application filed October 12, 1909. Serial No. 522,317.

*To all whom it may concern:*

Be it known that I, WILLIAM H. TEUER, a citizen of the United States, residing at Carterville, in the county of Jasper and State of Missouri, have invented certain new and useful Improvements in Pipe-Couplings, of which the following is a specification, reference being had to the accompanying drawings.

This invention relates to certain new and useful improvements in pipe couplings and more particularly to a device of this character which is designed for use in the coupling of a hose to a main water pipe.

The primary object of the present invention is to provide a hose coupling of extremely simple construction whereby the connection between the hose and the water main may be very quickly made.

A further object is to provide a coupling of such construction that any desired water pressure may be obtained without danger of leakage at the coupling heads.

A further object is to provide a male and female coupling head, said female head being provided with a spring seat having a spring positioned therein about a central cylindrical wall which is adapted to be disposed in the end of the male coupling head, said male head carrying spring plates adapted to engage behind shoulders on the female coupling head and securely hold the heads in coupled position, said spring exerting its force in the direction of the water flow.

With these and other objects in view, the invention consists of the novel construction, combination and arrangement of parts, hereinafter fully described and claimed, and illustrated in the accompanying drawings, in which—

Figure 1 is a top plan view of the coupling embodying my improvements; Fig. 2 is a longitudinal section on the line 2—2 of Fig. 1; Fig. 3 is a transverse section on the line 3—3 of Fig. 1; and Fig. 4 is a detail side elevation of the male coupling head. Fig. 5 is a detail fragmentary view of the female member showing the same closed.

Referring to the drawings 5 indicates the female coupling head which has integrally formed therewith an interiorly threaded extension 6 which is adapted to engage with the main water pipe. The head 5 comprises the outer and inner concentrically disposed cylindrical walls 7 and 8, thus providing between them an annular chamber 9. The inner cylindrical wall 8 is of substantially the same diameter and practically forms a continuation of the extension 6. The base of the chamber 9 forms a seat 10 for a coil spring 11 which is disposed in said chamber between the concentric walls 7 and 8. The outer end of the female member 5 is formed with a circumscribing enlargement 12 which, as clearly shown in Fig. 2, is inclined upwardly from its outer end to provide a shoulder 13, the purpose of which will be later set forth. Also disposed within the chamber 9 and surrounding the inner cylindrical portion 8 of the head there is a collar or gasket 14 which is longitudinally movable thereon and engages with the outer end of the coil spring 11.

The male coupling head comprises the cylindrical body portion 15 and the reduced extension 16 over which the end of the flexible hose is engaged. The body portion 15 is adapted to be received between the concentric walls 7 and 8 of the female head and engages with the outer face of the annular gasket 14. It will be noted that the outer end of the male coupling head is beveled on an angle of substantially 45°, as shown at 17 in Fig. 2. By thus beveling the end of the head a sharp edge is provided which bites into the gasket 14 and securely positions the same between the end of the coupling head and the spring 11. Secured to the exterior of the male head and at diametrically opposite points there are the spring plates 18 which, as shown in the drawings, are secured to the head by means of suitable screws 19, though it will be understood that other analogous fastening devices may be employed for this purpose. These springs normally extend outwardly from the coupling head, as shown in Fig. 4, and they are provided at their outer ends with the integral inwardly extending shoulders 20 which are adapted to be engaged behind the shoulders 13 of the female coupling head when the coupling heads are connected. The outer face of these shoulders are beveled or inclined, as shown at 21, for engagement with the inclined periphery of the enlargement 12 on the end of the coupling head 5. Also formed on the outer end of the spring plates 18 are the rings 22 through which the finger is adapted to be inserted when it is desired to disengage the shoulders 12 and 13 to separate the coupling heads.

In the operation of my improved coupling, the male coupling head is positioned between the outer and inner walls 7 and 8 of the female head and inserted into the annular chamber 9. The heads are now forced together and as the male head enters the female head, the spring plates 18 will ride up upon the inclined surface of the enlargement 12 until the shoulders 20 are engaged behind the shoulders 13. When in this position the inner cylindrical wall of the female head is extended into the body portion 15 of the male head, and the coil spring 11 forces the gasket 14 tightly against the sharp edge of the end of said body portion. This construction, it will be obvious, will prevent the escape of any water between the two heads, irrespective of the amount of pressure which may exist within the connection. By providing the enlargement 12 entirely around the end of the female coupling head, the two heads may be brought together at any point of their circumference, thus producing a very quick connection of the hose to the water main and eliminating a great amount of time consumed in threading the two coupling heads together as is necessitated by the present construction of hose couplings.

From the foregoing it will be seen that I have provided a hose coupling of extremely simple construction which may be manufactured at a minimum cost and is especially adaptable for use on fire hose, where an extremely quick connection of the hose to the water main is highly desirable. While I have shown and described what I believe to be the preferred embodiment of my invention, it will of course be understood that various modifications may be resorted to without in the scope of the claims without departing from the essential features or sacrificing any of the advantages of the invention.

From reference to Fig. 5 it will be noted that the inner cylindrical wall 8 is extended beyond the outer end of the outer wall 7 and is provided with exterior threads as shown at 8' to receive the closure cap 23. When the coupling is not used, this cap is threaded upon the projecting end of the cylindrical wall 8 and abuts against the extremity of the inclined enlarged end of the female member, thus securely closing the same and protecting the interior thereof.

Having thus described the invention what is claimed is:

1. In a coupling, the combination with a female coupling head comprising inner and outer concentrically disposed walls forming a chamber therein, an interiorly threaded extension integrally formed on said head in longitudinal alinement with the inner wall, of a coil spring disposed in said chamber and engaged with the rear wall of said chamber, a gasket surrounding the inner wall and engaged with the outer end of the spring, said head having a circumscribing enlargement on its outer end, the periphery of said enlargement being inclined rearwardly and outwardly from the end of the head to form a shoulder thereon, and a male coupling head having a tubular body portion adapted to be inserted between the outer and inner walls of the female head, the extremity of said male head being inclined outwardly in one direction to form a sharpened edge, said edge being adapted to bite into said gasket and form a water tight closure between the two heads, a plurality of spring plates secured at one end to said male head and normally extending outwardly at an angle thereto, said plates having shoulders formed on their outer ends, said shoulders being provided with inclined faces adapted to engage with the inclined surface of the enlargement on said female head and to move inwardly upon the same when the heads are engaged, said shoulders engaging behind the shoulders formed by said enlargement and held in such position by the spring plates, the coil spring within the female head being placed under tension by the inward movement of the male head, and finger rings integrally formed on the outer ends of said spring plates to remove the shoulders thereon from engagement with the shoulders on the female head.

2. In a coupling, the combination with male and female head coupling heads, said female head comprising outer and inner concentrically disposed cylindrical walls, said inner wall extending beyond the outer extremity of the outer wall and provided with exterior screw threads, said extremity being adapted to receive a closure cap, the end of said cap abutting against the end of the outer wall of said female head to close the space between said walls, of a coil spring disposed between said outer and inner walls, a gasket movable between said walls engaged with the end of said spring, a circumscribing shoulder adjacent to the outer end of said female head, said male head being adapted for insertion between the walls of said female head and having engagement with the outer face of said gasket, a plurality of spring plates secured to said male head, and a shoulder on the outer end of each of said plates adapted to be positioned behind the shoulder of the female head when the male head is forced between the walls of said female head and the spring therein placed in operation.

In testimony whereof I hereunto affix my signature in the presence of two witnesses.

WILLIAM H. TEUER.

Witnesses:
C. R. HAZZARD,
O. P. TENER.

Correction in Letters Patent No. 951,889.

Affidavit having been filed showing that the name of the patentee in Letters Patent No. 951,889, granted March 15, 1910, for an improvement in "Pipe-Couplings," should have been written and printed *William H. Tener* instead of "William H. Teuer," it is hereby certified that the proper correction has been made in the files and records pertaining to the case in the Patent Office, and should be read in the said Letters Patent that the same may conform thereto.

Signed and sealed this 7th day of June, A. D., 1910.

[SEAL.]

C. C. BILLINGS,
*Acting Commissioner of Patents.*